United States Patent [19]

Yamagiwa et al.

[11] 4,177,481

[45] Dec. 4, 1979

[54] MAGNETIC RECORDING AND/OR REPRODUCING APPARATUS WITH CHROMINANCE CROSSTALK ELIMINATION

[75] Inventors: Kazuo Yamagiwa; Masahiro Tada, both of Tokyo, Japan

[73] Assignee: Sony Corporation, Tokyo, Japan

[21] Appl. No.: 814,676

[22] Filed: Jul. 11, 1977

[30] Foreign Application Priority Data

Jul. 14, 1976 [JP] Japan .............................. 51-83661[U]

[51] Int. Cl.$^2$ ............................................... H04N 5/79
[52] U.S. Cl. ........................................... 358/8; 358/4; 360/29
[58] Field of Search .................. 358/4, 8, 12; 360/18, 360/19, 21, 29, 30, 124

[56] References Cited

U.S. PATENT DOCUMENTS

| | | | |
|---|---|---|---|
| 3,968,514 | 6/1976 | Narahara et al. | 358/4 |
| 4,007,482 | 2/1977 | Amari | 358/4 |
| 4,007,484 | 2/1977 | Amari | 358/4 |
| 4,010,490 | 3/1977 | Ota | 358/4 |

*Primary Examiner*—Bernard Konick
*Assistant Examiner*—Donald McElheny, Jr.
*Attorney, Agent, or Firm*—Lewis H. Eslinger; Alvin Sinderbrand

[57] ABSTRACT

In recording periodic information signals having first intervals and second intervals which are subdivisions of the first intervals, for example, the chrominance components of color video signals having field and line intervals, and which are recorded in respective areas or increments of successive parallel tracks on a record medium; interference due to crosstalk between signals recorded in next adjacent tracks is substantially reduced or eliminated by recording the information signals in such next adjacent tracks with first and second carriers, respectively, which have their phases changed in opposite directions by $2\pi/N$ and $2\pi/M$, respectively, for successive second intervals, with each of N and M being a whole number greater than 2 which is negative to indicate a phase change or shift in the clockwise direction or positive to indicate a phase change in the counterclockwise direction, and with each of N and M being selected to satisfy the equation $1/N - 1/M = \frac{1}{2}$.

18 Claims, 8 Drawing Figures

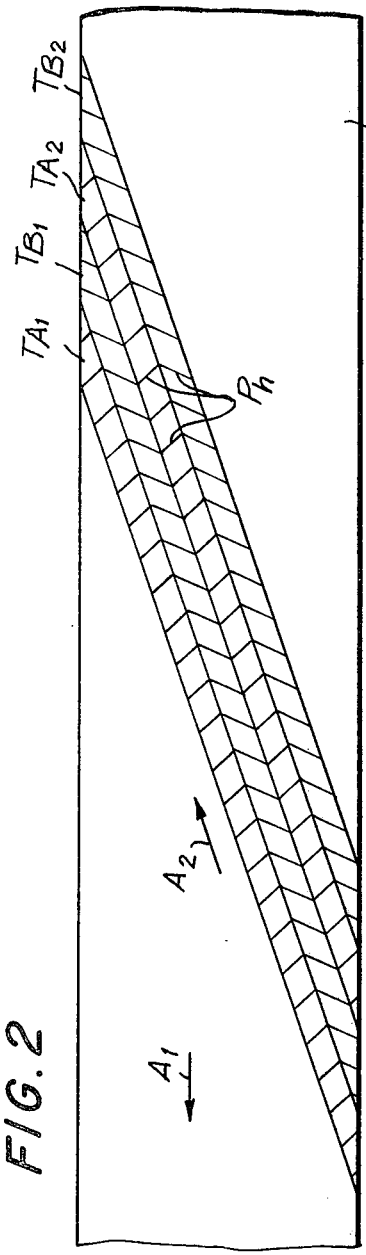
FIG. 2
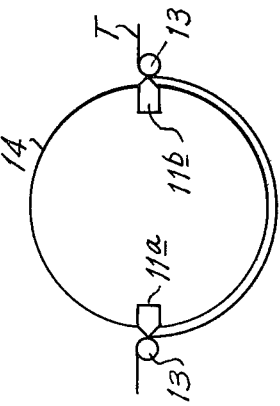
FIG. 3
FIG. 4A  FIG. 4B
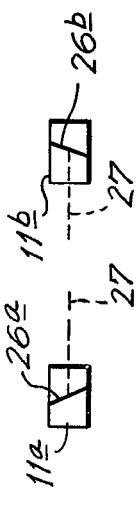
$$\cos[(\omega_C-\omega_S)t + n\frac{2\pi}{N} + (\alpha_A-\theta_A)]$$
$$\cos[(\omega_C-\omega_S)(t+\tau) + (n+1)\frac{2\pi}{N} + (\alpha_A-\theta_A)]$$
FIG. 5
$$\cos[(\omega_C-\omega_S)t + m\frac{2\pi}{M} + (\alpha_B-\theta_B)]$$
$$\cos[(\omega_C-\omega_S)(t+\tau) + (m+1)\frac{2\pi}{M} + (\alpha_B-\theta_B)]$$
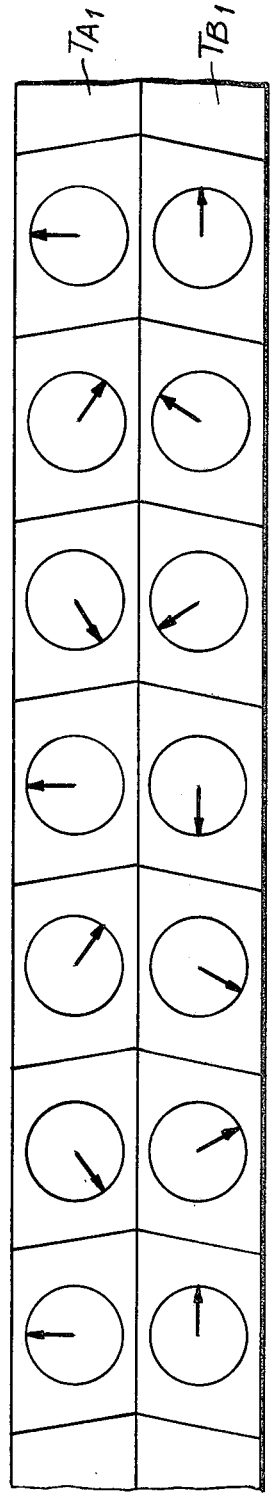
FIG. 6

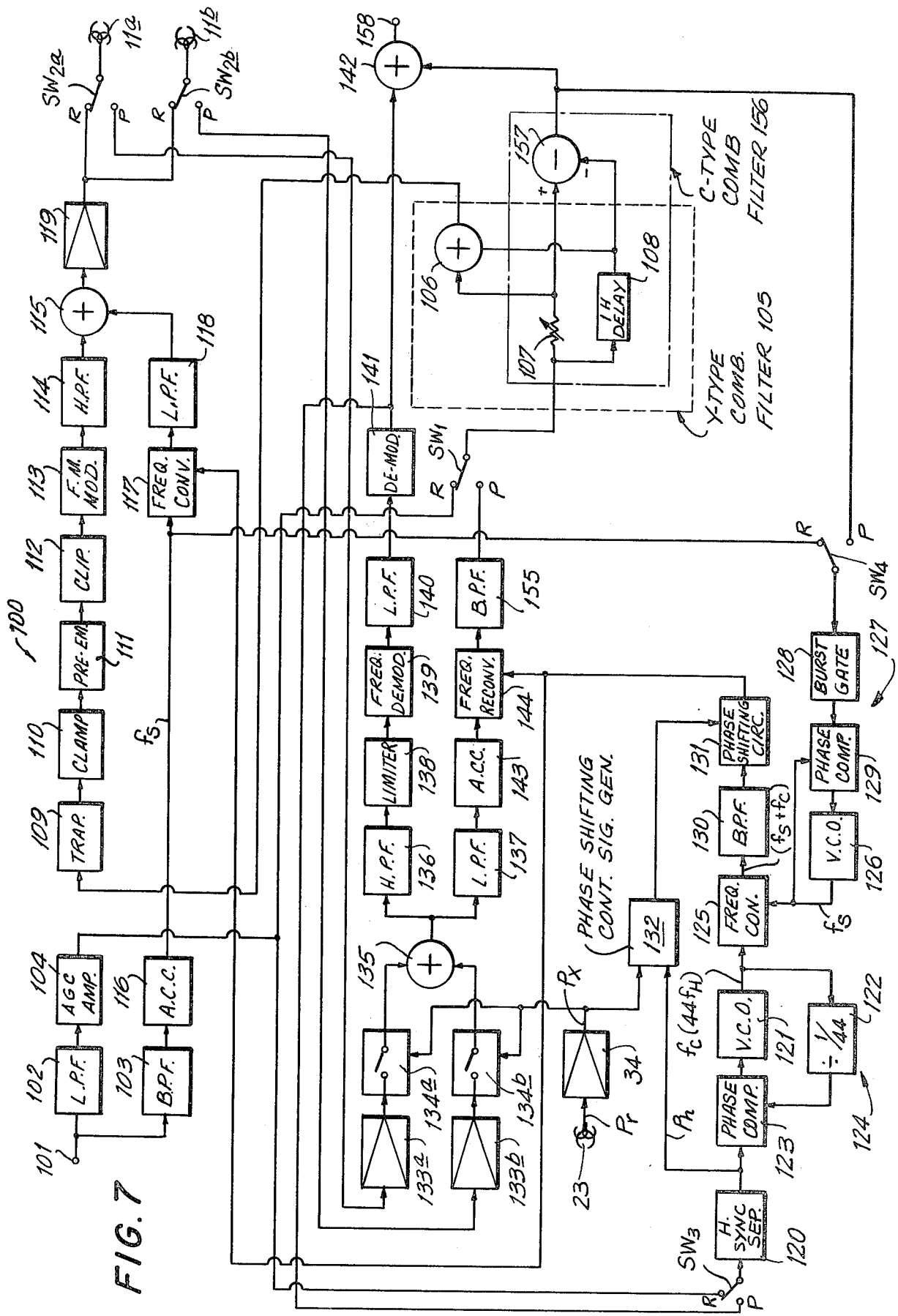

MAGNETIC RECORDING AND/OR REPRODUCING APPARATUS WITH CHROMINANCE CROSSTALK ELIMINATION

BACKGROUND OF THE INVENTION

1. Field of the Invention

This invention relates generally to the recording and reproducing of information signals, such as, color video signals, and more particularly is directed to the reduction of interference due to cross-talk in the reproduction of relatively low frequency signals recorded in adjacent tracks which are very close together, for example, abutting or even in overlapping relation.

2. Description of the Prior Art

It is well known to record video signals on a magnetic tape or other record medium by scanning successive parallel tracks on the record medium with one or more transducers energized by the video signals. In effecting such recording of video signals, it has been the usual practice to provide guard bands or unrecorded gaps between the successive parallel tracks so that, when a transducer scans one of the tracks for reproducing the signals recorded therein, such transducer will not also reproduce crosstalk, that is, signals recorded in the adjacent tracks. However, the provision of guard bands between the successive parallel tracks reduces the recording density, that is, the amount of signal information recorded on a unit area of the record medium, and thus does not permit the efficient utilization of the record medium for the recording of video signals.

One effort made to minimize cross-talk while permitting an increase in the recording density has been to use two transducers having air gaps with different azimuth angles for recording and reproducing signals in the next adjacent or alternate tracks, respectively. This is relatively easy to do because apparatus for magnetically recording and/or reproducing video signals usually includes a rotary guide drum provided with two alternately operative transducers or heads which can have air gaps with different azimuth angles. The tape is wrapped helically about a portion of the perimeter of the guide drum and is moved longitudinally while the transducers or heads are rotated, thus causing the heads alternately to scan respective tracks on the tape for recording or reproducing signals therein. Each transducer or head, in the recording operation of the apparatus, effects magnetization of magnetic domains in the magnetic coating on the tape in what would appear to be, if such domains were visible, a series of parallel lines or stripes each having a length as great as the width of the track, and each having an orientation that corresponds to the azimuth angle of the gap of the respective transducer or head. In the reproducing or playback operation of the apparatus, each track is scanned by the transducer or head having its gap aligned with the parallel, but fictitious, lines of that track, from which it follows that the gap of the transducer or head scanning a track for reproducing the video signals recorded therein extends at an angle to the mentioned fictitious lines of the tracks next adjacent to the track being scanned. By reason of the foregoing, if a transducer or head, in scanning a track for reproducing the video signals recorded therein, overlaps an adjacent track or otherwise reproduces signals recorded in the latter, the well-known azimuth loss will result in attenuation of the cross-talk signal reproduced from the adjacent track.

When recording color video signals which include luminance and chrominance components, it is known to separate such components and then to frequency modulate a relatively high frequency carrier with the luminance component, while the chrominance component is frequency converted so as to have its frequency band shifted below the frequency band of the frequency modulated luminance component, whereupon the frequency modulated luminance component and the frequency converted chrominance component are combined to provide a composite video signal which is recorded in the successive parallel tracks. Since the previously mentioned azimuth loss is generally proportional to the frequency of the signals, the azimuth loss is relatively effective to decrease or eliminate interference due to cross-talk in respect to the relatively high frequency frequency-modulated luminance component. However, interference due to cross-talk from the relatively low frequency or frequency converted chrominance component is not sufficiently reduced by the use of transducers having different azimuth angles. Thus, when recording color video signals, it has been proposed, for example, as disclosed in detail in U.S. Pat. No. 4,007,482, issued Feb. 8, 1977 and having a common assignee herewith, to reduce or eliminate interference due to cross-talk in respect to a relatively low frequency signal recorded in adjacent tracks by recording the frequency converted component or other low frequency signal in such adjacent tracks with different first and second carriers, respectively, which may be distinguished from each other by their respective polarity characteristics. In a particular disclosed embodiment of the foregoing scheme, the first carrier for the frequency converted chrominance component has its phase unchanged throughout the recording of the video signals in a respective track, while the second carrier for the chrominance component recorded in the next adjacent track has its phase inverted or changed by 180° for successive line intervals in the case of recording NTSC color video signals, or after each two line intervals in the case of recording PAL color video signals. When a head scans a particular track for reproducing the video signals recorded therein, the chrominance component of cross-talk signals from the tracks next adjacent to the scanned track can be conveniently suppressed or eliminated, for example, with the aid of a simple comb filter, by reason of the different polarity or phase characteristics of the carriers with which the chrominance component was recorded in the scanned track and in the tracks adjacent thereto, respectively.

Although the above described arrangement specifically disclosed in U.S. Pat. No. 4,007,482 effectively eliminates interference due to cross-talk in respect to the chrominance component while permitting a high recording density to be achieved by eliminating guard bands between the tracks and reducing the width of the latter, a few problems are encountered in the practical application thereof. More specifically, it is known that the second harmonic of the carrier frequency $f_c$ of the frequency converted chrominance component should be in interleaving relation with the frequency spectra of the luminance component which particularly appear at the horizontal or line frequency $f_H$ and multiples of the latter. Thus, in the existing arrangement, since the carrier of the frequency converted chrominance component recorded in every other track has its phase or polarity unchanged during the recording in each such track, it is necessary to provide the carriers of the frequency converted chrominance component with a frequency $f_c$ which is an odd multiple of $\frac{1}{2}f_H$, that is, $f_c=(2m-1)\frac{1}{4}f_H$ or $2f_c=(2m-1)\frac{1}{2}f_H$, in which m is a suitable whole number, for interleaving with the luminance component. By reason of the foregoing, when converting the chrominance component from its original carrier frequency $f_s$ to the relatively low carrier frequency $f_c$ for recording, and when reconverting the reproduced chrominance component back to its original or standard carrier frequency $f_s$, it is necessary to provide a frequency converting and reconverting signal with a frequency, such as, for example, $f_s+44f_H-\frac{1}{4}f_H$, which inconveniently includes a $\frac{1}{4}f_H$ fraction.

Furthermore, when frequency reconverting the chrominance component of the video signals reproduced from the successive tracks, the circuit for providing the frequency reconverting signal includes an automatic phase control (APC) circuit for maintaining the proper phase relation of the frequency reconverting signal to the carrier of the reproduced chrominance component. However, in the case of the chrominance component recorded in the respective track with its carrier having the phase thereof inverted or changed by 180° for successive line intervals or after each two line intervals, the automatic phase control circuit cannot follow or adjust for such large phase changes and it is desirable to provide the APC circuit with an additional phase identifying or detecting circuit.

OBJECTS AND SUMMARY OF THE INVENTION

Accordingly, it is an object of this invention to provide an improved apparatus for recording and/or reproducing periodic information signals, such as video signals having luminance and chrominance components, in successive parallel tracks on a record medium, and in which such tracks can be abutting, that is, not provided with guard bands therebetween, for optimum utilization of the record medium, and further in which the signals reproduced from each of the record tracks are of good resolution or quality and cross-talk from adjacent tracks is reduced or eliminated while minimizing or avoiding the above described problems encountered with the existing arrangement.

A more specific object of the invention is to provide an improved color video signal recording and/or reproducing system, as aforesaid, in which both luminance and chrominance components of the color video signal can be recorded in adjacent tracks during every line interval, but in such a way that interference due to cross-talk in respect to the low frequency components, such as the frequency converted chrominance component recorded in adjacent tracks, is inherently minimized or can be minimized by simple signal processing.

In accordance with an aspect of this invention, in recording periodic information signals having first intervals and second intervals which are subdivisions of the first intervals, for example, the chrominance components of color video signals having field and line intervals, and which are recorded in respective areas or increments of successive parallel tracks on a record medium, interference due to cross-talk between signals recorded in next adjacent tracks is substantially reduced or eliminated by recording the information signals in such next adjacent tracks with first and second carriers, respectively, of the same frequency which both have their phases changed, but in opposite directions, for successive second intervals, for example, successive line intervals of NTSC signals or at each two line intervals of PAL signals, with the angular amounts of such phase changes of the first and second carriers, respectively, totalling 180°. In other words, the first and second carriers have their phases changed in opposite directions by $2\pi/N$ and $2\pi/M$, respectively, with each of N and M being a whole number having an absolute value greater than 2 which is negative to indicate a phase change or shift in the clockwise direction or positive to indicate a phase change in the counterclockwise direction, and with each of N and M being selected to satisfy the equation $1/N-1/M=\frac{1}{2}$. When the carriers of the information signals recorded in the next adjacent tracks satisfy the above requirements, upon reproduction of a signal recorded in a particular track, the cross-talk signal simultaneously reproduced from a next adjacent track can be conveniently suppressed or eliminated in a simple signal processing circuit including a comb filter.

Further, when the invention as summarized above is applied to the recording and/or reproducing of the chrominance components of color video signals, the frequency converting signal by which the frequency of the chrominance carrier is reduced preparatory to recording and the frequency reconverting signal by which the reproduced chrominance component has its carrier frequency restored to the standard value can conveniently have frequencies that are the sum of the standard or original chrominance carrier frequency $f_s$ and a whole or integral multiple of the horizontal or line frequency $f_H$, while the described phase changes of the carriers with which the frequency converted chrominance components are recorded in the adjacent tracks cause such carriers and the second harmonics thereof to be in substantially interleaving relation to the spectra of the luminance component. Moreover, in certain embodiments of the invention, for example, when the carriers of the frequency converted chrominance components recorded in adjacent tracks undergo phase changes of no more than 90°, the automatic phase control (APC) circuit can operate to maintain the necessary phase relation of the frequency reconverting signal to the carrier of the reproduced frequency converted chrominance component without the addition of a phase identifying or detecting circuit.

The above, and other objects, features and advantages of the invention, will be apparent in the following detailed description of an illustrative embodiment thereof which is to be read in connection with the accompanying drawings.

BRIEF DESCRIPTION OF THE DRAWINGS

FIG. 2 is an enlarged diagrammatic view illustrating successive parallel tracks on a portion of magnetic tape and in which video signals are recorded by the apparatus of FIG. 1;

FIG. 3 is a schematic plan view of a tape guide drum included in the apparatus of FIG. 1, and showing the arrangement of recording and reproducing magnetic heads associated with such guide drum;

FIGS. 4A and 4B are diagrammatic views illustrating the relative disposition of air gaps of the magnetic heads shown on FIG. 3; FIG. 5 is a diagrammatic view showing fragments of two of the tracks which are next adjacent each other on FIG. 2;

FIG. 6 is a diagrammatic view illustrating the manner in which the carriers of frequency converted chrominance components of the color video signals recorded in next adjacent tracks have their phases shifted or changed for successive line intervals of the color video signals in accordance with one embodiment of the present invention; and FIG. 7 is a block diagram showing in greater detail the recording and reproducing circuits of an apparatus according to this invention for recording and reproducing color video signals.

DETAILED DESCRIPTION OF PREFERRED EMBODIMENTS

Figure 1:
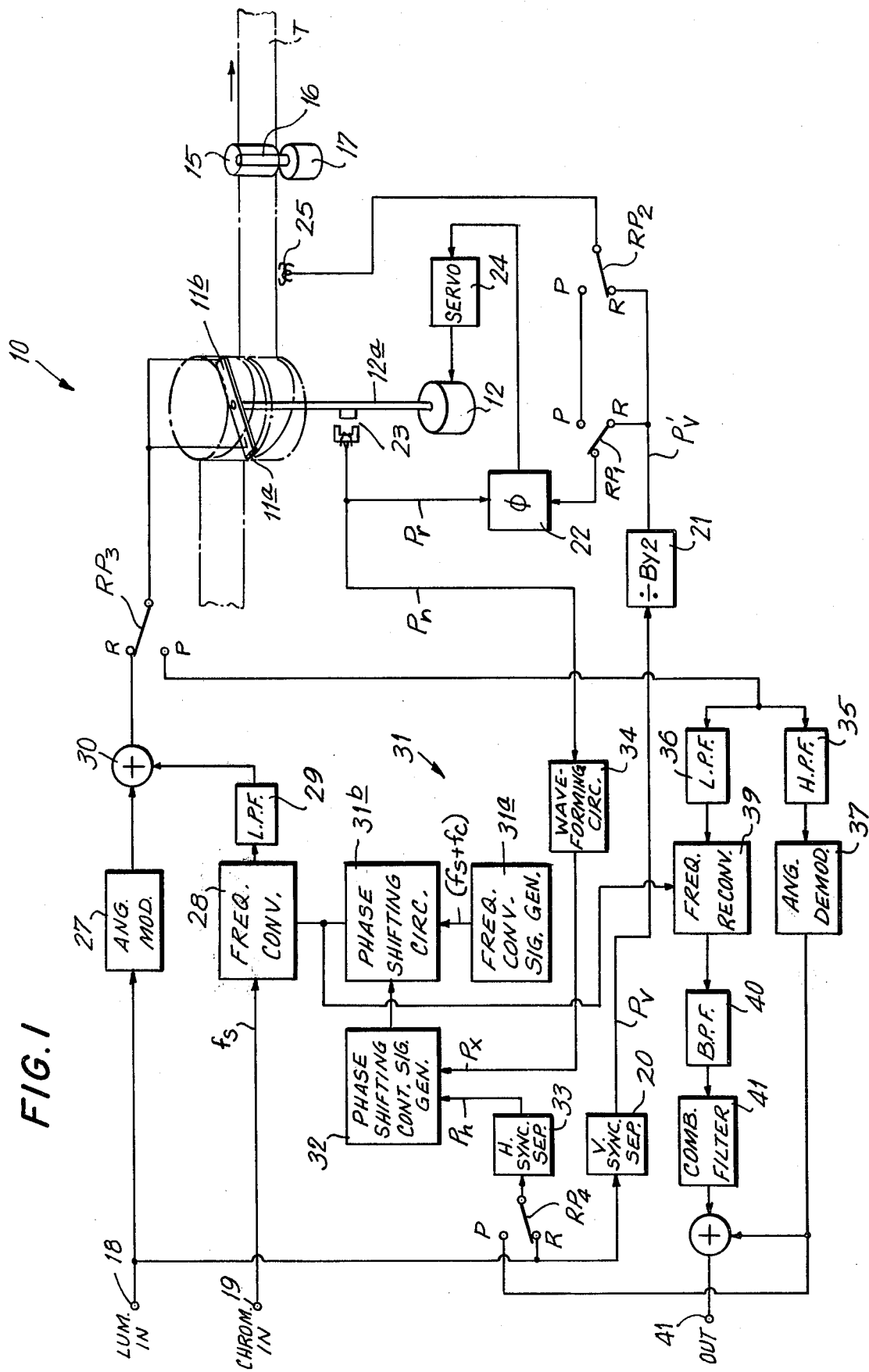
FIG. 1 is a schematic block diagram illustrating the basic components of an apparatus according to this invention for recording and reproducing color video signals so as to minimize or eliminate cross-talk interference between frequency converted chrominance components of the video signals recorded in successive parallel tracks on a magnetic tape.

Referring to the drawings in detail, and initially to FIG. 1 thereof, it will be seen that the invention is there shown applied to a magnetic tape color video signal recording and reproducing apparatus 10 of the helical scan type having a pair of diametrically opposed, rotary magnetic heads 11a and 11b rotated at the rate of 30 revolutions per second by means of a motor 12. As shown particularly on FIG. 3, a magnetic tape T is suitably guided, for example, by guide rollers 13, so as to extend helically about approximately ½ of the periphery of a guide drum 14 associated with heads 11a and 11b, and the tape T is driven longitudinally at a selected tape speed by the cooperative action of a pinch roller 15 with a capstan 16 driven by a motor 17. As tape T is thus driven longitudinally, the rotated heads 11a and 11b alternately scan successive parallel tracks extending obliquely across the tape, for example, as indicated at $T_{A1}, T_{B1}, T_{A2}, T_{B2}$,---etc. on FIG. 2.

In the apparatus shown on FIG. 1, heads 11a and 11b are intended to alternately record successive field intervals of the color video signals which have their luminance and chrominance components suitably separated from each other and applied to input terminals 18 and 19, respectively. In order to synchronize the rotation of heads 11a and 11b with the field intervals of the color video signals to be recorded so that each of the rotary heads will record a field interval as it scans a respective record track extending obliquely across tape T, a sync separating circuit 20 is connected to input terminal 18 for separating vertical synchronizing signals $P_v$ from the luminance component of the color video signals. The separated vertical synchronizing signals $P_v$, which occur at the frequency of the field intervals, are applied to a frequency dividing circuit 21 which divides by 2 so as to provide synchronizing pulses $P'_v$ at the frequency of the frame intervals. The synchronizing pulses $P'_v$ are applied to a contact R of a record-playback switch $RP_1$ which, in its record position as shown, supplies the synchronizing pulses $P'_v$ to one input of a phase comparator 22. The other input of phase comparator 22 receives rotation indicating pulses $P_r$ from a generator 23, for example, associated with the shaft 12a connecting motor 12 with heads 11a and 11b, so that pulse generator 23 produces a rotation indicating pulse $P_r$ for each revolution of the rotary heads, with such pulse being in a predetermined phase relation to the rotational position of heads 11a and 11b. On the basis of phase deviation between the synchronizing pulses $P'_v$ and the rotation indicating pulses $P_r$, phase comparator 22 provides a suitable servo control signal to a servo circuit 24 by which motor 12 is controlled. Thus, the rotation of heads 11a and 11b is controlled so that, during a recording operation, each head will commence its scanning obliquely across tape T at the commencement of a field interval of the video signals being recorded. The synchronizing pulses $P'_v$ are further shown to be applied to a contact R of a record-playback switch $RP_2$ which, in its recording position, as shown, applies the successive synchronizing pulses $P'_v$ to a fixed magnetic head 25 which is disposed to record the synchronizing pulses $P'_v$ as track identifying control signals at suitably spaced apart locations along a longitudinal edge of tape T.

As is shown on FIG. 2, the speed of longitudinal movement of tape T indicated by the arrow $A_1$ may be selected so that, as heads 11a and 11b alternately move obliquely across the tape in the direction indicated by the arrow $A_2$, the successive parallel tracks $T_A$ and $T_B$ in which video signals are recorded by heads 11a and 11b, respectively, will be in contiguous or abutting relation to each other. Moreover, the speed of longitudinal movement of tape T may be selected so that the obliquely extending areas alternately scanned on tape T by heads 11a and 11b are in abutting of contiguous relation, in which case the resulting record tracks $T_A$ and $T_B$ will have widths equal to the widths of the heads 11a and 11b, respectively. Alternatively, the obliquely extending areas scanned by the heads 11a and 11b may be made to overlap, for example, by reducing the speed of longitudinal movement of tape T, in which case, the resulting record tracks $T_A$ and $T_B$ will have widths smaller than the widths of the rotary heads for increasing the recording density of information signals on tape T. In either case, that is, whether the abutting tracks $T_A$ and $T_B$ have widths equal to or smaller than the widths of the heads 11a and 11b by which video signals were respectively recorded in such tracks, it will be apparent that, during a reproducing operation of apparatus 10, when heads 11a and 11b alternately scan tracks $T_A$ and $T_B$, respectively, for reproducing the signals recorded therein, heads 11a and 11b will simultaneously reproduce cross-talk signals from the next adjacent tracks $T_B$ and $T_A$, respectively.

As previously mentioned, each of the tracks $T_A$ and $T_B$ preferably has recorded therein the signal information corresponding to a respective field interval of the video signals, and each track is shown schematically on FIG. 2 to be divided into successive areas or increments each having recorded therein the signal information corresponding to a horizontal or line interval of the respective field of the video signals. Each line interval and each field interval of the video signals contains a blanking and synchronizing portion and, in accordance with accepted practice, the relative movements of the tape and the heads indicated by the arrows $A_1$ and $A_2$ are desirably regulated in accordance with the synchronizing signals of the video signals so as to obtain so-called H-alignment of the areas in which line intervals are recorded in each track with the areas in which line intervals are recorded in the next adjacent tracks. In other words, as shown schematically on FIG. 2, the ends of the margins between the areas in which the line intervals are recorded in each of the tracks $T_A$ are aligned, in the direction transverse to the lengths of the tracks, with the adjacent ends of such margins in the next adjacent tracks $T_B$.

The recording of the signals with H-alignment, as described above, is effective to minimize or eliminate interference due to cross-talk from the horizontal synchronizing signals $P_h$ of the video signals recorded in the adjacent tracks.

Further, as shown schematically on FIGS. 4A and 4B, heads 11a and 11b preferably have air gaps 26a and 26b, arranged at different azimuth angles in respect to the plane of rotation of the heads represented by the dotted line 27. By reason of the foregoing, each of heads 11a and 11b, when recording video signals in the respective tracks on tape T, effects magnetization of magnetic domains in the magnetic coating on the tape in what would appear to be, if such domains were visible, a series of parallel lines or stripes extending across the respective track and each having an orientation that corresponds to the azimuth angle of the gap of the respective head 11a or 11b.

In accordance with accepted practice, the luminance component of the color video signal applied to input terminal 18 is treated separately from the chrominance component applied to terminal 19. More specifically, the luminance component is shown to be applied from terminal 18 to an angular modulator 27 in which it modulates the phase or frequency of a carrier having a relatively high frequency so that the resulting phase or frequency modulated luminance component will be recorded in a higher frequency portion of the available frequency band. Thus, when the video signals are recorded in tracks $T_A$ and $T_B$ by heads 11a and 11b which have gaps with different azimuth angles, and the heads 11a and 11b are thereafter employed for reproducing the signals recorded in tracks $T_A$ and $T_B$, then the well-known azimuth loss results in attenuation of the high frequency portions, that is, the phase or frequency modulated luminance components, of the signals reproduced from tracks $T_B$ and $T_A$ during the scanning of tracks $T_A$ and $T_B$, respectively. However, the chrominance signal component applied to input terminal 19 is, in accordance with well known practice, frequency converted from a band around the normal chrominance carrier frequency, which in the case of the NTSC signal is approximately 3.58 MHz, to a relatively low carrier frequency of about 600 to 700 KHz. Since the azimuth loss is generally proportional to the frequency of the signals, the interference due to cross-talk from low frequency signals, such as, the frequency converted chrominance component, is not reduced to the same degree by the use of heads or transducers having different azimuth angles as in cross-talk from the high frequency signals, such as, the phase or frequency modulated luminance component. Thus, even if the heads 11a and 11b having gaps with different azimuth angles are used for recording and reproducing video signals in tracks $T_A$ and $T_B$, respectively, there would still be interference due to cross-talk from the frequency converted chrominance components recorded in side-by-side areas or line intervals of the next adjacent tracks.

Generally, in accordance with the present invention, interference due to cross-talk between relatively low frequency portions of signals recorded in next adjacent tracks is substantially reduced or eliminated by recording the low frequency portions of signals in such next adjacent tracks with first and second carriers, respectively, of the same frequency which both have their phases changed, but in opposite directions, at predetermined intervals along the respective tracks, for example, at successive line intervals of NTSC video signals or at each two line intervals of PAL video signals, with the angular amounts of such phase changes of the first and second carriers, respectively, totalling 180°. In other words, in the apparatus 10 for recording and reproducing color video signals, the chrominance component which is frequency converted to have a relatively low carrier frequency is recorded in the tracks $T_A$ and $T_B$ with first and second carriers having their phases changed in opposite directions by $2\pi/N$ and $2\pi/M$, respectively, for each line interval of NTSC signals or at each two line intervals of PAL signals, with each of N and M being a whole number greater than 2 which is negative to indicate a phase change or shift in the clockwise direction or positive to indicate a phase change in the counterclockwise direction, and with each of N and M being selected to satisfy the equation $1/N - 1/M = \frac{1}{2}$.

Values of N and M which satisfy the foregoing requirements are, for example, 3 and $-6$, respectively, and 4 and $-4$, respectively. It will be apparent that, in th case of recording NTSC signals with N and M having values of 3 and $-6$, respectively, the carrier of the frequency converted chrominance component recorded in each of the tracks $T_A$ will have its phase shifted or changed 120° in the counterclockwise direction for each line interval of the video signals, for example, as shown in respect to the track $T_{A1}$ on FIG. 6, while the carrier of the frequency converted chrominance component recorded in each of the tracks $T_B$ will have its phase shifted or changed by 60° in the clockwise direction for each of the successive line intervals of the video signals, for example, as shown in respect to the track $T_{B1}$ on FIG. 6. When the carriers of the frequency converted chrominance component of the signals recorded in the next adjacent tracks satisfy the foregoing requirements, upon reproduction of the signal recorded in a particular track, the cross-talk due to the chrominance component of a signal recorded in the next adjacent track can be conveniently suppressed or eliminated in a simple signal processing circuit including a comb filter, as hereinafter described in detail.

As is well known, the chrominance component of the color video signal has a carrier with an original frequency $f_s$ which is in the upper part of the video signal band, for example, a frequency of 3.579545 MHz, hereinafter referred to as approximately 3.58 MHz, in the case of an NTSC color video signal, so as to be an odd multiple (455) of $\frac{1}{2}f_H$ (the horizontal or line frequency) which, in the case of an NTSC signal, is 15.75 KHz. Thus, the frequency spectra of the chrominance component applied to terminal 19 on FIG. 2 will be in interleaved relation to the frequency spectrum of the luminance component applied to terminal 18. In the apparatus 10 according to this invention, the chrominance component with the original carrier frequency $f_s$ is applied to a frequency converter 28 for conversion in the latter to a frequency band below that of the phase or frequency modulated luminance component issuing from modulator 27. The phase or frequency modulated luminance component from modulator 27 and the frequency converted chrominance component from converter 28, after passage through a low pass filter 29, are applied to respective inputs of an adding or mixing circuit 30 so as to be combined in the latter for forming a composite signal applied to a contact R of a record-playback switch $RP_3$. In the recording position of record-playback switch $RP_3$, as shown, the composite signal from mixing circuit 30 is applied therethrough to heads 11a and 11b so as to be alternately recorded by the latter in respective tracks $T_A$ and $T_B$.

The frequency conversion of the chrominance component in frequency converter 29 is effected by applying a suitably phase shifted frequency converting signal from a circuit 31 to converter 28. Circuit 31 is shown on FIG. 1 to include a frequency converting signal generator 31a which produces a frequency converting signal with a frequency $(f_s+f_c)$, that is, a frequency which is the sum of the original chrominance carrier frequency $f_s$ and a frequency $f_c$ which may be any suitable multiple, such as 44, of the line or horizontal frequency $f_H$. In other words, in the case of recording an NTSC color video signal, the output of frequency converting signal generator 31a may have a frequency of about 4.27 MHz. Such frequency converting signal from generator 31a is applied to a phase shifting circuit 31b in which, during the recording of a field interval by head 11a in a respective track $T_A$, the phase of the frequency converting signal is shifted by $2\pi/N$ in one direction, for example, in the counterclockwise direction, for each line interval of the video signal, whereas, during the recording of a field interval by head 11b in each of the tracks $T_B$, phase shifting circuit 31b is effective to shift the frequency converting signal in the opposite or clockwise direction by $2\pi/M$ for each line interval of the video signal.

The above described phase shifting of the frequency converting signal by circuit 31b is controlled by a suitable control signal from a phase shifting control signal generator 32 in response to the reception by the latter of horizontal synchronizing signals $P_h$ from a horizontal sync separator 33 and of a rectangular waveform signal $P_x$ from a waveforming circuit 34 which is activated by the rotation indicating pulses $P_r$ from generator 23. In the recording operation of apparatus 10, horizontal sync separator 33 is connected through a record-playback switch $RP_4$ with input terminal 18 so as to separate the horizontal synchronizing signals $P_h$ from the luminance component of the color video signals being applied to that terminal. Further, the rectangular waveform signal $P_x$ produced by circuit 34 has a period equal to the frame interval of the video signals so as to provide signal $P_x$ with a high level during one field interval, for example, during each field interval recorded by head 11a, and with a low level during the next field interval, for example, during each field interval recorded by head 11b. Thus, for example, during each field interval when signal $P_x$ is at the high level, each horizontal synchronizing signal $P_h$ applied to phase shifting control signal generator 32 causes the latter to provide a control signal to phase shifting circuit 31b by which the latter shifts the phase of the frequency converting signal by $2\pi/N$ in the counterclockwise direction. On the other hand, during each field interval when the signal $P_x$ is at the low level, each horizontal synchronizing signal $P_h$ applied to circuit 32 causes the latter to provide a control signal to phase shifting circuit 31b by which the latter is made to shift the phase of the frequency converting signal by $2\pi/M$ in the clockwise direction.

For the reproducing operation of apparatus 10, the record-playback switches $RP_1$-$RP_4$ which are preferably ganged or interconnected are changed-over to engage their respective P contacts. Upon such changeover of the record-playback switches, the track identifying or control signals recorded along a longitudinal edge of tape T are reproduced by fixed head 25 and applied through switches $RP_2$ and $RP_1$ to one input of phase comparator 22 which, at its other input, continues to receive the rotation indicating pulses $P_r$ from generator 23. Thus, phase comparator 22 compares the phases of the rotation indicating pulses $P_r$ with the phases of the reproduced track identifying control signals from head 25 and, in response to a phase deviation therebetween, the output of comparator 22 causes servo circuit 24 to suitably control motor 12 for ensuring that heads 11a and 11b will accurately scan tracks $T_A$ and $T_B$, respectively. The composite recorded signals alternately reproduced by heads 11a and 11b from tracks $T_A$ and $T_B$, respectively, are applied through record-playback switch $RP_3$ to a high pass filter 35 and a low pass filter 36 which are respectively adapted to pass the phase or frequency modulated luminance component and the frequency converted chrominance component of the reproduced composite signals. The phase or frequency modulated luminance component passed by filter 35 is applied to an angular demodulator 37 for phase or frequency demodulation in the latter so as to obtain a demodulated reproduced luminance component which is applied to one input of an adding or mixing circuit 38. The reproduced frequency converted chrominance component passed by filter 36 is applied to a frequency reconverter 39 in which the chrominance component has its carrier reconverted to the original frequency $f_s$ with a constant phase by means of a frequency reconverting signal obtained from phase shifting circuit 31b. Such frequency reconverting signal may be derived from generator 31a so as to have the frequency $(f_s+f_c)$, and then is phase shifted in circuit 31b in the same manner as has been described above in connection with the recording operation of apparatus 10. However, in the reproducing operation of apparatus 10, horizontal sync separator 33 is connected through record-playback switch $RP_4$ to the output of demodulator 37 so that the horizontal synchronizing signals $P_h$ applied to phase shifting control signal generator 32 are then separated from the demodulated luminance component. Finally, in the reproducing operation of apparatus 10, the frequency reconverted chrominance component is applied through a band pass filter 40 to a C-type comb filter 41 in which as hereinafter described in detail, chrominance component cross-talk reproduced from a track next adjacent the one being scanned by a head 11a or 11b is cancelled or eliminated and only the frequency reconverted chrominance component reproduced from the track being scanned is passed to another input of adding or mixing circuit 38. Accordingly, mixing circuit 38 combines the reproduced chrominance component free of cross-talk with the reproduced luminance component so as to provide a reproduced color video signal at an output terminal 41.

The manner in which cross-talk in respect to the chrominance component is eliminated when, in accordance with this invention, the frequency converting signal has its phase shifted by $2\pi/N$ and $2\pi/M$ for successive line intervals during recording of field intervals in tracks $T_A$ and $T_B$, respectively, and N and M have values satisfying the equation $1/N - 1/M = \frac{1}{2}$, will now be described, as follows:

If the chrominance component to be recorded in the n-th line interval of the track $T_{A1}$ on FIG. 5 is expressed as $$\sin[\omega_s t + \theta_A] \qquad (1)$$

in which $\omega_s$ is the angular frequency of the chrominance component carrier and $\theta_A$ is the initial phase shift thereof, then the chrominance component to be recorded in the next or (n+1)-th line interval is expressed as $$\sin[\omega s(t+\tau)+\theta_A] \quad (2)$$

in which $\tau$ is the duration of one horizontal or line interval.

Similarly, the chrominance component to be recorded in m-th line interval of the adjacent track $T_{B1}$ which is in side-by-side relation to the n-th line interval of the track $T_{A1}$ is expressed as $$\sin[\omega st+\theta_B] \quad (3)$$

in which $\theta_B$ is the initial phase shift of the chrominance component carrier, and the chrominance component to be recorded in the next or (m+1)-th line interval of track $T_{B1}$ is expressed as $$\sin[\omega s(t+\tau)+\theta_B] \quad (4)$$

Since the frequency converting signal which is supplied to frequency converter 28 changes its phase by $2\pi/N$ for each line interval in track $T_{A1}$, the frequency converting signals in the n-th and (n+1)-th line intervals are respectively $$\sin[\omega ct + n\frac{2\pi}{N} + \alpha_A] \quad (5)$$

and $$\sin[\omega c(t+\tau) + (n+1)\frac{2\pi}{N} + \alpha_A] \quad (6)$$

in which $\omega c$ is angular frequency of the frequency converting signal and $\alpha_A$ is the initial phase shift thereof.

Similarly, since the frequency converting signal changes its phase by $2\pi/M$ for every line interval in the track $T_{B1}$, the frequency converting signals in the m-th and (m+1)-th line intervals are, respectively, $$\sin[\omega ct + m\frac{2\pi}{M} + \alpha_B] \quad (7)$$

and $$\sin[\omega c(t+\tau) + (m+1)\frac{2\pi}{M} + \alpha_B] \quad (8)$$

Generally, a frequency-converted chrominance component can be expressed as the product of the original chrominance component and the frequency converting signal, and the resulting product signals are supplied to low pass filter 29 to derive therefrom only a signal having the angular frequency $\omega L = \omega c - \omega s$. Accordingly, the frequency converted chrominance component to be recorded in the n-th line interval of track $T_{A1}$ is represented by that portion of the product of expressions (1) and (5) above which has the angular frequency $\omega L$, that is, $$\cos[(\omega c - \omega s)t + n\frac{2\pi}{N} + (\alpha_A - \theta_A)] \quad (9)$$

Similarly, the frequency converted chrominance component to be recorded in the (n+1)-th line interval of track $T_{A1}$ is represented by that portion of the product of expressions (2) and (6) above which has the angular frequency $\omega L$ or $(\omega c - \omega s)$, that is, $$\cos[(\omega c - \omega s)(t+\tau) + (n+1)\frac{2\pi}{N} + (\alpha_A - \theta_A)] \quad (10)$$

In the same manner, the frequency converted chrominance components to be recorded in the m-th and (m+1)-th line intervals of track $T_{B1}$ are obtained from the product of expressions (3) and (7) and from the product of expressions (4) and (8), respectively, to be $$\cos[(\omega c - \omega s)t + m\frac{2\pi}{M} + (\alpha_B - \theta_B)] \quad (11)$$

and $$\cos[(\omega c - \omega s)(t+\tau) + (m+1)\frac{2\pi}{M} + (\alpha_B - \theta_B)] \quad (12)$$

Thus, the frequency converted chrominance components defined by the expressions (9) and (10) and by the expressions (11) and (12) are actually recorded in tracks $T_{A1}$ and $T_{B1}$, as shown on FIG. 5.

During reproducing, when the track $T_{A1}$ is scanned by head 11a, the frequency converting signal which is then supplied to frequency re-converter 39 also changes its phase by $2\pi/N$ for each line interval. Therefore, the frequency re-converting signals, which are supplied at the times when the n-th and (n+1)-th line intervals are being reproduced, are respectively expressed as $$\sin[\omega ct + k\frac{2\pi}{N} + \rho] \quad (13)$$

and $$\sin[\omega c(t+\tau) + (k+1)\frac{2\pi}{N} + \rho] \quad (14)$$

The frequency reconverted chrominance component is a portion of the product of the frequency converted chrominance component being reproduced from the track which is scanned and of the frequency reconverting signal simultaneously applied to frequency reconverter 39, which portion of the product has the angular frequency $\omega s$ so as to pass through band pass filter 40. Therefore, during reproducing of the n-th line interval of track $T_{A1}$, the frequency reconverted chrominance component $SM_n$ having the angular frequency $\omega s$ in the product of expressions (9) and (13) is expressed as follows:

$$SM_n = \sin[\omega st + (k-n)\frac{2\pi}{N} + (\rho - \alpha_A + \theta_A)] \quad (15)$$

Further, it is to be noted that, when head 11a reproduces the n-th line interval of track $T_{A1}$, head 11a also picks up a cross-talk signal from the adjacent m-th line interval of track $T_{B1}$. Such cross-talk signal defined by expression (11) is also frequency reconverted with the frequency converting signal defined by expression (13), so that the cross-talk signal $SC_n$ having the angular frequency $\omega s$ is expressed as follows:

$$SC_n = \sin[\omega st + (\frac{k}{N} - \frac{m}{M})2\pi + (\rho - \alpha_B + \theta_B)] \quad (16)$$

Similarly, when the head 11a reproduces the (n+1)-th line interval of track $T_{A1}$, the main frequency reconverted chrominance component $SM_{n+1}$ and the cross-talk signal $Sc_{n+1}$, each having the angular frequency $\omega s$, are respectively obtained from the product of expressions (10) and (14) and from the product of expressions (12) and (14), and are expressed as follows:

$$SM_{n+1} = \sin[\omega s(t + \tau) + (k - n)\frac{2\pi}{N} + (\rho - \alpha_A + \theta_A)] \quad (17)$$

and $$SC_{n+1} = \sin[\omega s(t + \tau) + \frac{k}{N} - \frac{m}{M})2\pi + \\ (\frac{1}{N} - \frac{1}{M})2\pi + (\rho - \alpha_B + \theta_B)] \quad (18)$$

As is known, the C-type comb filter 41 may simply include a subtracting circuit in which signals being received thereby, for example, during the reproducing of line interval (n+1) of track $T_{A1}$, having subtracted therefrom the signals reproduced and received by comb filter 41 during the preceding line interval n. Accordingly, during reproducing of line interval (n+1) of track $T_{A1}$, the chrominance component $S_{n+1}$ obtained at the output of comb filter 41 is as follows:

$$S_{n+1} = (SM_{n+1} + SC_{M+1}) - (SM_n + SC_n)$$

or $$S_{n+1} = (SM_{n+1} - SM_n) + (SC_{n+1} - SC_n) \quad (19)$$

Since the original carrier frequency $f_s$ of the chrominance component is established to be an odd multiple of $\frac{1}{2}f_H$, as previously noted, the duration or period $\tau$ of one horizontal or line interval is an odd multiple of $\frac{1}{2}$ of the period of the original or standard chrominance carrier. Accordingly, expression

(17) or $SM_{n+1} =$ $$\sin[\omega s(t + \tau) + (k - n)\frac{2\pi}{N} + (\rho - \alpha_A + \theta_A)]$$

can be rewritten as:

$$SM_{n+1} = -\sin[\omega st + [k - n)\frac{2\pi}{N} + (\rho - \alpha_A + \theta_A)] \quad (20)$$

From a comparison of expression (20) with expression (15), it is apparent that $$SM_{n+1} = -SM_n \quad (21)$$

Similarly, and further in view of the fact that $1/N - 1/M = \frac{1}{2}$, expression (18) or $$SC_{n+1} = \sin[\omega s(t + \tau) + (\frac{k}{N} - \frac{m}{M})2\pi + \\ (\frac{1}{N} - \frac{1}{M})2\pi + (\rho - \alpha_B + \theta_B)]$$

can be rewritten as:

$$SC_{n+1} = -\sin[\omega st + (\frac{k}{N} - \frac{m}{M})2\pi + \pi + (\rho - \alpha_B + \theta_B)]$$

or $$SC_{n+1} = \sin[\omega st + (\frac{k}{N} - \frac{m}{M})2\pi + (\rho - \alpha_B + \theta_B)] \quad (22)$$

From a comparison of expression (22) with expression (16) it is apparent that $$SC_{n+1} = SC_n \quad (23)$$

By substituting equations (21) and (23) in equation (19), there is obtained:

$$S_{n+1} = 2SM_{n+1}$$

In other word, during reproducing of the signal recorded in line interval (n+1) of track $T_{A1}$, the output of comb filter 41 is only the frequency reconverted chrominance component from that line interval (n+1), but with its level doubled, whereas, the cross-talk signal from the line interval (m+1) of the adjacent track $T_{B1}$ has been cancelled or eliminated in the comb filter 41.

It will be noted that, when each of N and M is greater than 2 in accordance with this invention, equation $1/N - 1/M = \frac{1}{2}$ requires that the carriers of the frequency converted chrominance components recorded in the adjacent tracks $T_A$ and $T_B$ both undergo phase changes $2\pi/N$ and $2\pi/M$ in opposite directions for successive line intervals, with the amount of each such phase change being substantially less than 180°. The effect of such phase changes is to modulate the carrier of the frequency converted chrominance component with a frequency which is a fraction of $f_H$. Thus, for example, in the case of N and M being (4, −4) so that the carriers of the frequency converted chrominance components recorded in tracks $T_A$ and $T_B$ are phase shifted in opposite directions by 90° for each line interval, the resulting carrier frequencies are $f_c + \frac{1}{4}f_H$ and $f_c - \frac{1}{4}f_H$ for ensuring interleaving of the spectra of the second harmonic of the frequency converted chrominance component with the luminance spectra. Substantial interleaving is similarly obtained, at least as to spectra of the frequency converted chrominance component which are of significant energy, when other values of N and M satisfying the previously stated conditions are selected in accordance with this invention. Thus, it will be apparent that, in the apparatus 10 according to this invention, the frequency $f_c$ can be a whole multiple of the line frequency $f_H$ for ease in generating and maintaining such frequency $f_c$. Of course, if desired, the frequency $f_c$ may be an odd multiple of $\frac{1}{2}f_H$, for example, it may be provided that $f_c = (44 - \frac{1}{2})f_H$ as in previously known video signal recording and reproducing apparatus.

Referring now to FIG. 7, it will be seen that, in the more detailed recording and reproducing circuits of an apparatus 100 according to this invention, as there shown, the color video signals to be recorded are applied from an input terminal 101 to a low pass filter 102 adapted to pass the luminance component and to a band pass filter 103 adapted to pass the band of the chrominance component. The output of low pass filter 102 is applied through an automatic gain control amplifier 104 and through a record-playback switch SW$_1$, in its record position as shown, to the input of a Y-type comb filter 105. The Y-type comb filter 105 is shown to include an adding circuit 106 having a first input that directly receives the gain-controlled output of low pass filter 102 through a variable resistor 107, while a second input of adding circuit 106 receives the gain-controlled output of low pass filter 102 through a delay line 108 providing a delay of one horizontal or line interval. Since the standard or original chrominance carrier frequency is an odd multiple of $\frac{1}{2}f_H$, the phase of the chrominance carrier is, in effect, reversed for successive line intervals with the result that the chrominance component is cancelled in adding circuit 106 and only the luminance component is obtained from the output of comb filter 105.

Thereafter, the luminance component from comb filter 105 is passed, in succession, through a trap circuit 109, a clamping circuit 110 which clamps the sync tip level of the luminance component to a fixed reference level, and a pre-emphasis circuit 111 to a white and dark clipping circuit 112 which removes overshoots resulting from the pre-emphasis of the luminance component. The clipped luminance component is applied from clipping circuit 112 to a frequency modulator 113 in which the luminance component frequency modulates a carrier of suitably high frequency. The frequency modulated luminance component is applied from modulator 113 through a high pass filter 114 to one input of a mixing circuit 115.

The chrominance component separated from the color video signals by filter 103 is passed through an automatic color control circuit 116 to a frequency converter 117 in which the chrominance component is converted to a frequency band lower than that of the frequency modulated luminance component supplied to mixing circuit 115. The resulting frequency converted component is supplied from frequency converter 117 through a low pass filter 118 to another input of mixing circuit 115 so as to be combined in the latter with the frequency modulated luminance component for providing a composite signal applied to a recording amplifier 119. The amplified composite signal is applied from amplifier 119 to record-playback switches $SW_{2a}$ and $SW_{2b}$ which, in their recording positions, as shown, supply the amplified composite signal to rotary magnetic heads 11a and 11b for recording by the latter, alternately, in respective tracks $T_A$ and $T_B$, as previously described.

The luminance component is further applied from the output of automatic gain control circuit 104 through a record-playback switch $SW_3$, in the record position of the latter, as shown, to a horizontal sync separator 120 which separates the horizontal synchronizing signals $P_h$ from the luminance component. In the illustrated apparatus 100, the circuit for providing the frequency converting signal for the chrominance component is shown to include a voltage controlled oscillator 121 providing an output $f_c$ with a center frequency of, for example, $44f_H$. The output $f_c$ is applied to a frequency divider 122 to be divided in the latter by 44, and the output of divider 122 is applied to a phase comparator 123 which also receives the separated horizontal synchronizing signals $P_h$ from separator 120. It will be appreciated that oscillator 121, divider 122 and phase comparator 123 form an automatic frequency control circuit in that comparator 123 compares the frequency of the output from divider 122 with the frequency $f_H$ of the separated horizontal synchronizing signals $P_h$ and, upon any deviation therebetween, provides a suitable control voltage to voltage controlled oscillator 121 for automatically maintaining the output $f_c$ at the frequency of $44f_H$.

The output $f_c$ from oscillator 121 is applied to a frequency converter 125 so as to be frequency converted in the latter by a frequency converting signal from a voltage controlled oscillator 126 which, for example, may have a center frequency $f_s$, that is, equal to the original or standard chrominance carrier frequency. The voltage controlled oscillator 126 forms part of an automatic phase control circuit 127 which is further shown to include a burst gate 128 which, when a record-playback switch $SW_4$ is in its record position, as shown, extracts burst signals from the chrominance component being applied to frequency converter 117. The burst signals extracted by gate 128 are applied to one input of a phase comparator 129 which, at another input, receives the output of voltage controlled oscillator 126. It will be apparent that, in the recording operation of apparatus 100, any phase difference between the burst signals extracted by gate 128 from the chrominance component of the color video signals to be recorded and the output of oscillator 126 causes comparator 129 to apply a suitable control voltage to voltage controlled oscillator 126 for effecting a required change in the phase of the frequency of the frequency converting signal applied from oscillator 126 to frequency converter 125, and hence in the phase of the frequency converting signal provided at the output of frequency converter 125 with the frequency ($f_s+f_c$). The frequency converting signal with the frequency ($f_s+f_c$) is applied from frequency converter 125 through a band pass filter 130 to a phase shifting circuit 131 which corresponds to the phase shifting circuit 31b described above with reference to FIG. 1, and which similarly effects shifting of the phase of the frequency converting signal by $2\pi/N$ and $2\pi/M$ in opposite directions for each line interval of the video signals being recorded in tracks $T_A$ and $T_B$ by the rotary heads 11a and 11b, respectively. The phase shifting circuit 131 is suitably controlled by a phase shifting control signal generating circuit 132 which corresponds to the circuit 32 described above with reference to FIG. 1. Thus, phase shifting control signal generating circuit 132 is shown to receive the horizontal synchronizing signals $P_h$ from separator 120 and the rectangular waveform signal $P_x$ produced by waveforming circuit 34 in response to the rotation indicating pulses $P_r$ from generator 23 which, as before, have a predetermined phase relation to the rotational position of heads 11a and 11b.

The frequency converting signal having its phase shifted by $2\pi/N$ in one direction for each line interval recorded in a track $T_A$, and further having its phase shifted by $2\pi/M$ in the opposite direction for each line interval recorded in a track $T_B$, is applied from phase shifting circuit 131 to frequency converter 117 so as to frequency convert the chrominance component from its original carrier frequency $f_s$ to the relatively low carrier frequency $f_c$, with the phase of the frequency converted chrominance component being correspondingly changed for each line interval of the video signals recorded in the tracks $T_A$ and $T_B$, respectively.

For a reproducing operation of apparatus 100, record-playback switches $SW_1$–$SW_4$ are changed over to their reproducing or playback positions so as to engage their respective contacts P. In the reproducing mode of operation, the composite signals alternately reproduced by heads 11a and 11b from respective tracks $T_A$ and $T_B$ are applied through reproducing amplifiers 133a and 133b to respective switching circuits 134a and 134b. The switching circuits 134a and 134b are controlled by rectangular waveform signal $P_x$ so as to be alternately closed only when the respective heads 11a and 11b are reproducing fields of video signal information from the respective tracks $T_A$ and $T_B$. The reproduced composite signals alternately obtained from switching circuits 134a and 134b are applied through a combining circuit 135 to a high pass filter 136 which passes only the reproduced frequency modulated luminance component and a low pass filter 137 which passes only the reproduced frequency converted chrominance component. The reproduced frequency modulated luminance component is applied from filter 136 through a limiter 138 to a frequency demodulator 139 for obtaining a demodulated luminance component. The demodulated luminance component is passed through a low pass filter 140 and then de-emphasized in a de-emphasis circuit 141 prior to being applied to one input of a mixing circuit 142. The reproduced frequency converted chrominance component is applied from low pass filter 137 through an automatic color control circuit 143 to a frequency reconverter 144 which corresponds to the frequency reconverter 39 on FIG. 1, and which is similarly operative to reconvert the frequency converted chrominance component to its original carrier frequency $f_s$ by means of the phase shifted frequency converting signal from circuit 131. The frequency reconverted chrominance component, as well as the cross-talk chrominance component or signal is applied from frequency reconverter 144 through a band pass filter 155 and switch $SW_1$ to the input of a C-type comb filter 156 corresponding to the comb filter 41 on FIG. 1. It will be noted that the C-type comb filter 156 includes a subtracting circuit 157 which, at one input, receives the output of band pass filter 155 directly through variable resistor 107, while another input of subtracting circuit 157 receives the output of band pass filter 155 through delay line 108.

As previously described, the chrominance component cross-talk reproduced from the track $T_B$ or $T_A$ during the scanning of a track $T_A$ or $T_B$, respectively, is cancelled or eliminated in C-type comb filter 156, while the chrominance component which is reproduced from the track being scanned is delivered, at an elevated level, from the output of filter 156 to mixing circuit 142 for combining in the latter with the luminance component, whereby to provide the desired reproduced color video signal at an output terminal 158.

It will further be noted that, in the reproducing mode of operation of apparatus 100, the reproduced luminance component from de-emphasis circuit 141 is applied through switch $SW_3$ to horizontal sync separator 120 for the separation of the horizontal synchronizing signals $P_h$ therefrom, and, further, that the chrominance component from the output of comb filter 156 is applied through switch $SW_4$ to gate 128 for the separation of the burst signals therefrom.

It will be appreciated that, in the recording and reproducing operations of apparatus 100, the frequency converting signal applied to frequency converter 117 or to frequency reconverter 144, respectively, from phase shifting circuit 131 has its phase shifted in one direction by $2\pi/N$ for each line interval during recording in a track $T_A$, while the phase of the frequency converting signal is shifted in the opposite direction by $2\pi/M$ for each line interval recorded in each track $T_B$, with each of N and M being a whole number greater than 2 and being selected to satisfy the equation $1/N - 1/M = \frac{1}{2}$. Thus, in accordance with the present invention, as previously described in detail, the color video signals can be recorded in abutting relatively narrow tracks for obtaining a high recording density, while the reproduced chrominance component is obtained free of cross-talk. Insofar as the luminance component is concerned, it will be appreciated that the luminance component is recorded as a frequency modulation of a relatively high frequency carrier so that cross-talk from the luminance component recorded in adjacent tracks is substantially eliminated by employing heads 11a and 11b with gaps having different azimuth angles for recording the video signals in adjacent tracks $T_A$ and $T_B$.

Furthermore, by using values of N and M which satisfy the conditions specified above, the frequency converted chrominance component, as recorded in each track, inherently has spectra such that its second harmonic is in substantial interleaving relation to the spectra of the luminance component even though the output of voltage controlled oscillator 126 has a central frequency corresponding to the original carrier frequency $f_s$ of the chrominance component. However, if desired, for certain values of N and M such as (3, −6), interleaving of the second harmonic of the carrier of the frequency converted chrominance component with the spectra of the luminance component may be further improved by providing voltage controlled oscillator 126 with an output having a central frequency of $(f_s \pm \frac{1}{4}f_H)$. In the latter case, the feedback of the output of voltage controlled oscillator 126 to an input of phase comparator 129 would be removed, and phase comparator 129 would be operative to compare the phase of the burst signals from gate 128 with the phase of the output of a fixed oscillator (not shown) having a frequency of $f_s$ so as to obtain the automatic phase control operation.

Finally, it will be appreciated that, for certain values of N and M in accordance with this invention, for example, when N and M are (4, −4) so that the frequency converted chrominance component undergoes successive phase changes or shifts of 90° for successive line intervals in one direction when recorded in a track $T_A$, and in the other or opposite direction when recorded in a track $T_B$, such phase shifts are within the pull-in range of the automatic phase control circuit 127, and thus can be accommodated by the latter without the addition of a phase identifying or detecting circuit thereto.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In apparatus for recording periodic information signals comprised of first intervals and predetermined numbers of second intervals included in each of said first intervals and which are recorded in respective areas of successive parallel tracks on a record medium: the combination of means for providing said periodic information signals with a carrier having its phase selectively changed in one direction by a first amount $2\pi/N$ and in the opposite direction by a second amount $2\pi/M$, with N and M each being a whole number having an absolute value greater than 2 and which is positive to indicate a phase change in said one direction and negative to indicate a phase change in said opposite direction, and with N and M being selected to satisfy the equation $1/N - 1/M = \frac{1}{2}$; and control means causing said first amount of phase change of the carrier for each of said second intervals of the information signals recorded in alternate ones of said parallel tracks and said second amount of phase change of the carrier for each of said second intervals of the information signals recorded in the remaining ones of said parallel tracks.

2. Apparatus according to claim 1; in which said information signals have an original carrier frequency; said means for providing the information signals with a carrier having its phase selectively changed includes frequency converting means receiving said information signals with said original carrier frequency, and means for producing a frequency converting signal applied to said frequency converting means and which selectively has said first and second amounts of said phase change for causing said frequency converting means to effect corresponding phase changes of the carrier of the information signals; and said control means determines which of said first and second amounts of phase change is selectively imparted to said frequency converting signal.

3. Apparatus according to claim 2; in which said means for producing the frequency converting signal includes oscillator means providing an output at the frequency of said frequency converting signal, and variable phase shifting means acting on said output of the oscillator means for selectively imparting said first and second amounts of phase change to said output under the control of said control means.

4. Apparatus according to claim 1; in which said periodic information signals are the chrominance component of a color video signal comprised of field intervals and line intervals and having an original carrier frequency for said chrominance component; said means for providing the information signals with a carrier having its phase selectively changed includes frequency converting means receiving said chrominance component, oscillator means providing an output at a frequency substantially different from the original carrier frequency of said chrominance component, and variable phase shifting means acting on said output of the oscillator means and being controlled by said control means for selectively imparting said first and second amounts of phase change to said output, the phase-changed output of said phase shifting means being applied to said frequency converting means so as to cause the latter to frequency convert the carrier of said chrominance component to a frequency substantially lower than said original carrier frequency with the resulting frequency converted chrominance component having said first and second amounts of phase change selectively incorporated therein.

5. Apparatus according to claim 4; in which said color video signal further contains a luminance component; and further comprising modulating means for angularly modulating said luminance component on a carrier having a frequency such that the band of frequencies of the resulting angularly modulated luminance component is above the carrier frequency of said frequency converted chrominance component, and mixing means for combining said frequency converted chrominance component and said angularly modulated luminance component into a composite signal to be recorded in said successive parallel tracks.

6. Apparatus according to claim 4; in which said original carrier frequency of the chrominance component is in frequency-interleaving relation to the frequency of said line intervals, and each of said second intervals is constituted by a predetermined number of said line intervals.

7. Apparatus according to claim 6; in which said color video signal is an NTSC signal, and each of said second intervals is constituted by one of said line intervals.

8. Apparatus according to claim 6; in which said color video signal is a PAL signal, and each of said second intervals is constituted by two of said line intervals.

9. Apparatus according to claim 1; in which said information signals are a portion of a video signal comprised of field intervals and horizontal line intervals and further containing horizontal synchronizing signals, and first and second transducers are provided for alternately scanning said successive parallel tracks so that said first transducer records the video signal in said alternate ones of the tracks and said second transducer records the video signal in said remaining ones of the tracks; and in which said control means includes separating means separating said horizontal synchronizing signals from the video signal, means providing a rectangular waveform signal having first and second levels during the scanning of tracks on the record medium by said first and second transducers, respectively, and phase shifting control signal generating means responsive to selected horizontal synchronizing signals from said separating means when said waveform signal is at said first level and at said second level for providing first and second control signals, respectively, causing said first and second amounts of phase change, respectively.

10. Apparatus according to claim 9; in which means for providing the information signals with a carrier having its phase selectively changed includes means for generating a frequency converting signal, phase shifting means acting on said frequency converting signal and responsive to said first and second control signals for imparting said first and second amounts, respectively, of phase change to said frequency converting signal, and frequency converting means receiving said video signal portion and said frequency converting signal from said phase shifting means for frequency converting said video signal portion and providing the latter with said first and second amounts of phase change.

11. In apparatus for recording and reproducing periodic information signals comprised of first intervals and predetermined numbers of second intervals included in each of said first intervals and which are recorded in respective areas of successive parallel tracks on a record medium: the combination of recording circuit means comprising means for providing said periodic information signals with a carrier having its phase selectively changed in one direction by a first amount of $2\pi/N$ and in the opposite direction by a second amount $2\pi/M$ with N and M each being a whole number having an absolute value greater than 2 and which is positive to indicate a phase change in said one direction and negative to indicate a phase change in the opposite direction, and with N and M being selected to satisfy the equation $1/N - 1/M = \frac{1}{2}$, and control means causing said first amount of phase change of the carrier for each of said second intervals of the information signals recorded in alternate ones of said successive parallel tracks and said second amount of phase change of the carrier for each of said second intervals of the information signals recorded in the remaining ones of said tracks; and reproducing circuit means comprising transducer means for reproducing information signals recorded in each of said tracks along with cross-talk signals from tracks next adjacent thereto, and means for providing said information signals reproduced from each of said tracks with a carrier of substantially constant phase and for eliminating said cross-talk signals therefrom on the basis of said first and second amounts of phase change of the carrier with which said information signals are recorded in the tracks which are next adjacent to each other.

12. Apparatus according to claim 11, in which said means for eliminating the cross-talk signals includes comb filter means.

13. Apparatus according to claim 11; in which said information signals have an original carrier frequency; said means for providing the information signals with a carrier having its phase selectively changed includes frequency converting means receiving said information signals with said original carrier frequency, and means for producing a frequency converting signal applied to said frequency converting means and which selectively has said first and second amounts of said phase change for causing said frequency converting means to effect corresponding phase changes of the carrier of the information signals; and said control means determines which of said first and second amounts of phase change is selectively imparted to said frequency converting signal.

14. Apparatus according to claim 13; in which said means for providing the information signals reproduced from each track with a carrier of substantially constant phase and for eliminating said cross-talk signals therefrom includes comb filter means having a frequency transmission characteristic to pass signals in the frequency spectrum of said carrier of substantially constant phase, and frequency reconverting means receiving the reproduced information signals and cross-talk signals and being operated by said frequency converting signal to convert the information signal carrier with said phase changes to said carrier of substantially constant phase for passage through said comb filter means while converting the carrier of said cross-talk signals to have a frequency spectrum substantially blocked by said comb filter means.

15. Apparatus according to claim 14; in which said comb filter means is a C-type comb filter with a delay period equal to each of said second intervals.

16. Apparatus according to claim 15; in which said periodic information signals are the chrominance component of a color video signal comprised of field intervals constituting said first intervals and horizontal line intervals constituting said second intervals, said chrominance component has an original carrier frequency which is in frequency interleaving relation to the horizontal line frequency, and the color video signal further contains a luminance component; said recording circuit means further comprises a Y-type comb filter for separating said luminance component from the color video signal and including delay means receiving the color video signal and having a delay equal to one horizontal line interval, and adding means having first and second inputs respectively receiving said color video signal and the output of said delay means; and said C-type comb filter of the reproducing circuit means includes subtracting means having first and second inputs, and means for applying the output of said frequency reconverting means to said first input of the subtracting means and through said delay means to said second input of the subtracting means during reproducing operation of said apparatus.

17. In an apparatus for reproducing periodic information signals comprised of first intervals and predetermined numbers of second intervals included in each of said first intervals and which are recorded in respective areas of successive parallel tracks on a record medium with the information signals recorded in alternate ones of said tracks having a carrier the phase of which changes in one direction by a first amount $2\pi/N$ for each of second intervals of the information signals and the information signals recorded in the remaining ones of said tracks having a carrier the phase of which changes in the opposite direction by a second amount of $2\pi/M$ for each of said second intervals, with N and M each being a whole number having an absolute value greater than 2 and which is positive and negative to indicate phase changes in said one and opposite directions, respectively, and with N and M being selected to satisfy the equation $1/N - 1/M = \frac{1}{2}$; the combination of transducer means for scanning along said tracks one at a time so as to reproduce the information signals recorded in each of said tracks along with cross-talk signals from the tracks next adjacent thereto, and means for providing said information signals reproduced from each of said tracks with a carrier of substantially constant phase and for eliminating said cross-talk signals therefrom on the basis of said first and second amounts of phase change of the carrier with which the information signals are recorded in the tracks which are next adjacent each other.

18. Apparatus according to claim 17; in which said means for providing the information signals reproduced from each track with a carrier of substantially constant phase and for eliminating said cross-talk signals therefrom includes comb filter means having a frequency transmission characteristic to pass signals in the frequency spectrum of said carrier of substantially constant phase, frequency reconverting means receiving the reproduced information signals and cross-talk signals, and means for producing a frequency converting signal applied to said frequency reconverting means and which selectively has said first and second amounts of phase change for causing said frequency reconverting means to convert the information signal carrier with said amount of phase change to said carrier of substantially constant phase for passage through said comb filter means while converting the carrier of the cross-talk signals to have a frequency spectrum substantially blocked by said comb filter means.

* * * * *